(12) United States Patent
Ikeda

(10) Patent No.: US 8,401,328 B2
(45) Date of Patent: Mar. 19, 2013

(54) IMAGE PROCESSING APPARATUS AND IMAGE PROCESSING METHOD

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 12/501,703

(22) Filed: Jul. 13, 2009

(65) Prior Publication Data

US 2010/0014775 A1 Jan. 21, 2010

(30) Foreign Application Priority Data

Jul. 16, 2008 (JP) .................. 2008-185293
Jun. 4, 2009 (JP) .................. 2009-135357

(51) Int. Cl.
G06K 9/40 (2006.01)
(52) U.S. Cl. ...................................................... 382/274
(58) Field of Classification Search .................. 348/712; 382/165, 170, 181, 190, 192, 218, 219
See application file for complete search history.

(56) References Cited

U.S. PATENT DOCUMENTS

| 4,547,807 | A | 10/1985 | Mitani | |
|---|---|---|---|---|
| 6,809,763 | B1* | 10/2004 | Yoshida | ......................... 348/248 |
| 7,365,880 | B2* | 4/2008 | Yamamoto et al. | ............ 358/2.1 |
| 2006/0152606 | A1 | 7/2006 | Noguchi | |
| 2006/0158704 | A1 | 7/2006 | Kameyama | |
| 2006/0181618 | A1 | 8/2006 | Kameyama | |
| 2007/0147701 | A1* | 6/2007 | Tanaka | ........................... 382/274 |
| 2007/0165120 | A1 | 7/2007 | Takane | |
| 2007/0247662 | A1* | 10/2007 | Kasai et al. | ................... 358/1.16 |
| 2008/0084488 | A1 | 4/2008 | Kim | |
| 2008/0219516 | A1 | 9/2008 | Suzuki et al. | |

FOREIGN PATENT DOCUMENTS

| CN | 1578475 | A | | 2/2005 |
|---|---|---|---|---|
| CN | 101023446 | A | | 8/2007 |
| EP | 2061233 | A1 | | 5/2009 |
| JP | 2005-049979A | A | | 2/2005 |
| JP | 2005-56004 | A | | 3/2005 |
| JP | 2005-092262A | A | | 4/2005 |
| JP | 2008-059197 | A | | 3/2008 |
| JP | 2008-263319A | A | | 10/2008 |
| JP | 2009-223916A | A | | 10/2009 |
| JP | 2010-193006A | A | | 9/2010 |
| KR | 2002014593 | A | * | 2/2002 |
| KR | 10-2006-0020998 | A | | 3/2006 |
| KR | 2006020998 | A | * | 3/2006 |
| KR | 10-2006-0020998 | | * | 10/2006 |

OTHER PUBLICATIONS

XP002662034; Ralph Gross et al.; "Face Recognition Across Pose and Illumination".
XP002662035; Li et al.
XP002662034; Ralph Gross et al.; "Face Recognition Across Pose and Illumination", Mar. 15, 2005.
XP002662035; Li et al., Mar. 15, 2005.

* cited by examiner

Primary Examiner — Gregory F Cunningham
(74) Attorney, Agent, or Firm — Canon USA Inc. IP Division

(57) ABSTRACT

An image processing apparatus includes a detection circuit configured to detect an image, a luminance correction circuit configured to determine luminance of the detected image and to execute correction for reducing a luminance variation in the detected image, and an extraction circuit configured to extract feature amount data from the detected image corrected by the correction circuit for use in authentication processing.

13 Claims, 8 Drawing Sheets

WEIGHT (0, 4)

| 1 | 1 | 1 | 1 | 1 | 1 | 1 |
|---|---|---|---|---|---|---|
| 1 | 1 | 1 | 1 | 1 | 1 | 1 |
| 0 | 1 | 1 | 1 | 1 | 1 | 0 |
| 0 | 0 | 1 | 1 | 1 | 0 | 0 |

LUMINANCE AVERAGE VALUE

| 100 | 100 | 100 | 80 | 40 | 30 | 30 |
|-----|-----|-----|----|----|----|----|
| 90  | 100 | 100 | 90 | 50 | 30 | 30 |
| 50  | 110 | 100 | 90 | 50 | 30 | 10 |
| 10  | 20  | 60  | 60 | 40 | 10 | 10 |

FIG.7

WEIGHT × LUMINANCE VALUE

| 100 | 100 | 100 | 80 | 40 | 30 | 30 |
|-----|-----|-----|----|----|----|----|
| 90  | 100 | 100 | 90 | 50 | 30 | 30 |
| 0   | 110 | 100 | 90 | 50 | 30 | 0  |
| 0   | 0   | 60  | 60 | 40 | 0  | 0  |

FIG.8A

COEFFICIENT FOR SETTING LUMINANCE LEVEL AT 68.6

| 0.69 | 0.69 | 0.69 | 0.86 | 1.71 | 2.29 | 2.29 |
|---|---|---|---|---|---|---|
| 0.76 | 0.69 | 0.69 | 0.76 | 1.37 | 2.29 | 2.29 |
| 1 | 0.62 | 0.69 | 0.76 | 1.37 | 2.29 | 1 |
| 1 | 1 | 1.14 | 1.14 | 1.71 | 1 | 1 |

FIG.8B

COEFFICIENT FOR SETTING LUMINANCE LEVEL AT 120

| 1.2 | 1.2 | 1.2 | 1.5 | 3 | 4 | 4 |
|---|---|---|---|---|---|---|
| 1.3 | 1.2 | 1.2 | 1.3 | 2.4 | 4 | 4 |
| 1 | 1.1 | 1.2 | 1.3 | 2.4 | 4 | 1 |
| 1 | 1 | 2 | 2 | 3 | 1 | 1 |

FIG.9

| SENSITIVITY IN PHOTOGRAPHING | CORRECTION GAIN UPPER LIMIT VALUE |
|---|---|
| 80 | 4 |
| 100 | 4 |
| 200 | 2 |
| 400 | 1 |

IMAGE PROCESSING APPARATUS AND IMAGE PROCESSING METHOD

BACKGROUND OF THE INVENTION

1. Field of the Invention

The present invention relates to an image processing apparatus and an image processing method, and particularly an image processing apparatus and an image processing method capable of extracting feature amount data to be used in face authentication.

2. Description of the Related Art

A face verification apparatus has conventionally been known to execute authentication processing based on image data obtained by photographing a human face. The face verification apparatus receives input of a face image of a person to be authenticated, which is photographed by an imaging apparatus using a solid image sensor. The face verification apparatus acquires feature amount data of the person to be authenticated, which indicates a feature amount of components constituting the face such as eyes, a nose, a mouth and a face contour, from a face image. Then, the face verification apparatus checks the feature amount data of a registered person stored in advance with each feature amount data of the person to be authenticated. The face verification apparatus determines similarity of the person to be authenticated with the registered person. Then, the face verification apparatus authenticates the person to be authenticated as the registered person who is determined to have the maximum similarity.

When the maximum similarity is smaller than a predetermined authentication threshold value, it is determined that the person to be authenticated is an unregistered person (the person to be authenticated is not verified as the registered person). Further, when the maximum similarity is equal to the authentication threshold value, it is previously determined that the person to be authenticated will be verified as either a registered person or an unregistered person.

The face verification apparatus supplies a result of authentication, for example, to a control apparatus for locking/unlocking a door of facilities. The control apparatus locks/unlocks the door according to the result of authentication. Further, it is discussed to utilize the face verification apparatus for specifying a user who makes a transaction at an automated teller machine (ATM). More specifically, it is discussed to install an imaging apparatus in an ATM to identify a user using a face image of the user photographed by the imaging apparatus. Accordingly, an operation such as insertion of a card (for example, a cash card) and entering of a personal identification number which has been used for authentication of a user becomes unnecessary, which improves operability.

A conventional face verification apparatus stores feature amount data of a registered person that is obtained from a front face image of the registered person. On the other hand, a lighting condition (lighting direction, brightness, color of lighting) in which the face image of a person to be authenticated is photographed during verification is determined depending on an installation environment of an imaging apparatus and a posture of the person to be authenticated during imaging processing. Thus, depending on the installation environment of the imaging apparatus, similarity between the feature amount data acquired from the face image of the person to be authenticated and the feature amount data of the registered person which corresponds to the person to be authenticated may be decreased. As a result, even when the person to be authenticated is the registered person, the person may be misidentified as an unregistered person.

In order to reduce probability of occurrence of misidentification (that is, a false rejection rate) which verifies a person to be authenticated who is a registered person as an unregistered person, an authentication threshold value may be set low. On the contrary, when the authentication threshold value is set low, the probability of occurrence of misidentification (that is, a false acceptance rate) is increased, which verifies a person to be authenticated who is not a registered person as the registered person. Thus, a security level is decreased. Accordingly, the authentication threshold value is set corresponding to the security level which is required in a system to be applied to the face verification apparatus. More specifically, in a system which requires a high security level, the authentication threshold value is set high. Thus, a reduction in a false acceptance rate is prioritized over a reduction in a false rejection rate.

Japanese Patent Application Laid-Open No. 2005-56004 discusses a technique for storing feature amount data of a registered person that is obtained from a plurality of face images photographed under different lighting conditions. This technique can improve authentication accuracy by reducing both the false rejection rate and the false acceptance rate. More specifically, the face images of the registered person are made into a three-dimensional (3D) model image. A plurality of two-dimensional (2D) model images different in lighting condition is generated from the 3D model image. Then, the feature amount data of the registered person is acquired from the plurality of the generated 2D model images and stored.

However, in a configuration discussed in Japanese Patent Application Laid-Open No. 2005-56004, since a plurality of pieces of the feature amount data of the registered person which is obtained from the plurality of face images in different lighting conditions needs to be stored for one registered person, there is a problem that registration operation is extremely troublesome. Then, there is a similar problem when not only the feature amount data of the registered person is stored but also the feature amount data of a person to be authenticated for determining similarity with the feature amount data of the registered person is acquired. More specifically, there is a problem in that the feature amount data of the person to be authenticated needs to be acquired from a plurality of face images which are photographed while changing the lighting conditions, in order to eliminate an influence of the lighting condition.

SUMMARY OF THE INVENTION

The present invention is directed to an image processing apparatus capable of extracting feature amount data which can obtain high authentication accuracy without using a plurality of pieces of face image data.

According to an aspect of the present invention, an image processing apparatus includes a detection circuit configured to detect an image, a luminance correction circuit configured to determine luminance of the detected image and to execute correction for reducing a luminance variation in the detected image, and an extraction circuit configured to extract feature amount data from the detected image corrected by the correction circuit for use in authentication processing.

According to another aspect of the present invention, an image processing apparatus includes a detection circuit configured to detect an image, a smear correction circuit configured to determine a smear generation area and a smear generation amount in the detected image and to correct a pixel value which is contained in the smear generation area based on the smear generation amount, and an extraction circuit configured to extract feature amount data to be used in authentication processing from the detected image corrected by the smear correction circuit.

According to yet another aspect of the present invention, a method for image processing includes detecting an image, determining luminance in the detected image and executing correction for reducing a luminance variation in the image, and extracting feature amount data from the detected image to which correction for reducing the luminance variation is executed for use in authentication processing.

According to yet another aspect of the present invention, a method for image processing includes detecting an image, determining a smear generation area and a smear generation amount in the detected image and correcting a pixel value which is contained in the smear generation area based on the smear generation amount, and extracting feature amount data from the detected image in which the pixel value contained in the smear generation area is corrected based on the smear generation amount for use in authentication processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates average luminance values of blocks.

FIG. 7 illustrates results of multiplying weight of blocks by luminance average values.

FIGS. 8A and 8B illustrate correction gains of blocks.

FIG. 9 illustrates a correction gain threshold value for each sensitivity in photographing.

DETAILED DESCRIPTION OF THE EMBODIMENTS

Various exemplary embodiments, features, and aspects of the invention will be described in detail below with reference to the drawings.

Figure 1:
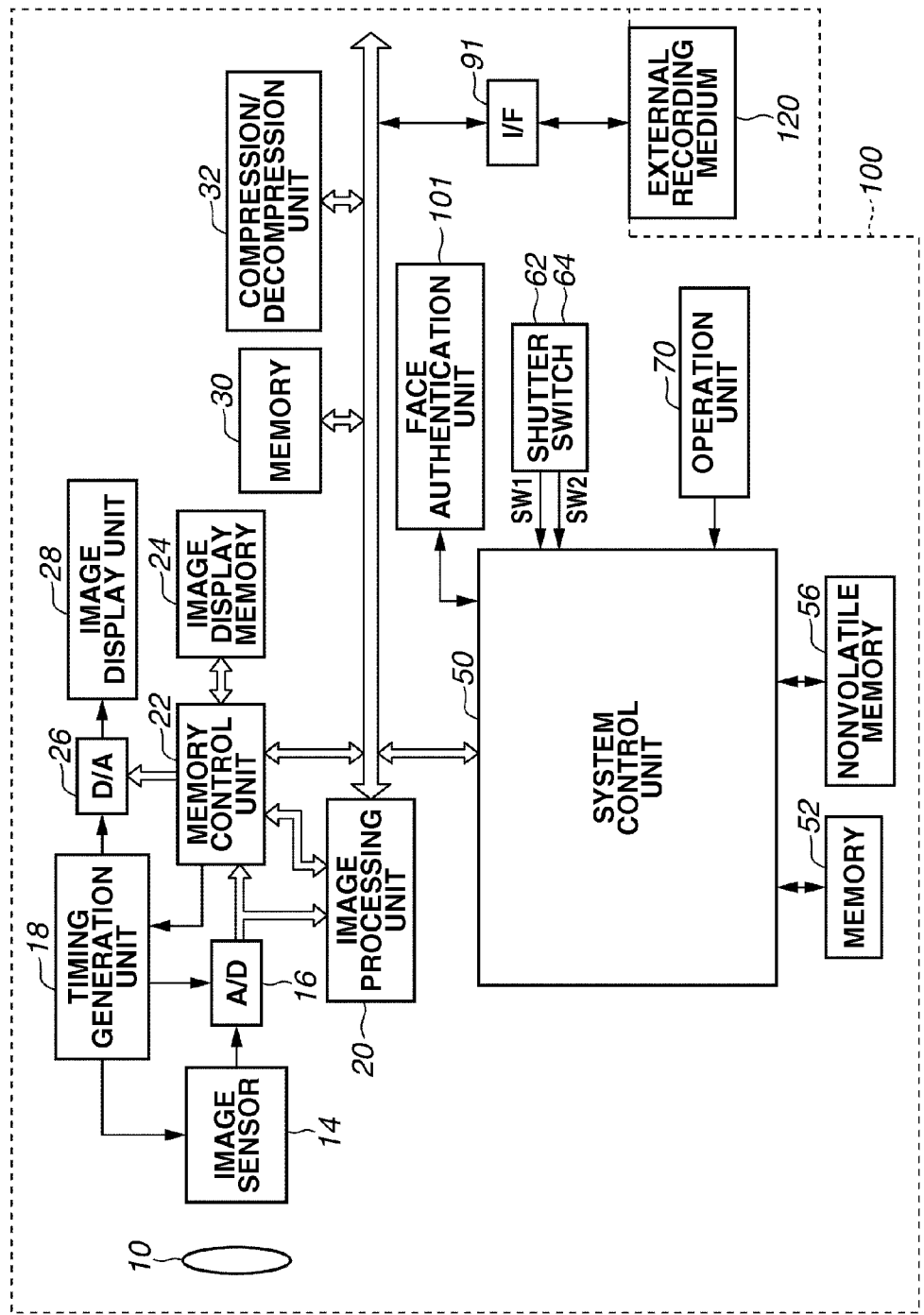
FIG. 1 illustrates a configuration example of a digital camera as one example of an image processing apparatus according to a first exemplary embodiment of the present invention.

FIG. 1 is a diagram illustrating a configuration of a digital camera as one example of an image processing apparatus according to a first exemplary embodiment of the present invention.

An image sensor 14 is configured of a photoelectric conversion element, such as a charge coupled device (CCD) and a complementary metal-oxide semiconductor (CMOS) sensor. The image sensor 14 converts an optical image transmitting through a photographing lens 10 into an electric signal. An analog-to-digital (A/D) converter 16 converts output of an analog signal of the image sensor 14 into a digital signal.

A timing generation unit 18 supplies a clock signal and a control signal to the image sensor 14, the A/D converter 16, and a digital-to-analog (D/A) converter 26.

An image processing unit 20 executes predetermined pixel interpolation processing and color conversion processing on data from the A/D converter 16 or data from a memory control unit 22.

The image processing unit 20 executes predetermined calculation processing using a photographed image data. The predetermined calculation processing will be described below.

The memory control unit 22 controls the A/D converter 16, the timing generation unit 18, the image processing unit 20, an image display memory 24, the D/A converter 26, a memory 30, and a compression/decompression unit 32.

The output data of the A/D converter 16 is written into the image display memory 24 or the memory 30 via the memory control unit 22.

Image data for display written into the image display memory 24 is displayed by an image display unit 28 including a liquid crystal display (LCD), an organic electroluminescence (EL) display or the like via the D/A converter 26. By successively displaying the photographed image data by the image display unit 28 an electronic view finder (EVF) function can be realized which displays an object image in real time.

The memory 30 is a storage device for storing a photographed still image and moving image. The memory 30 includes a sufficient storage capacity for storing a predetermined number of still images and a moving image of a predetermined time period. Thus, in continuously photographing a plurality of still images, a large amount of images can be written into the memory 30 at a high speed. Further, the memory 30 can be used as an operation area of a system control unit 50.

The compression/decompression unit 32 reads an image stored in the memory 30, executes known data compression processing or data decompression processing using adaptive discrete cosine transform (ADCT), wavelet transform or the like, and writes the processed data into the memory 30.

The system control unit 50 is, for example, a central processing unit (CPU) and controls the entire digital camera 100 by executing a program stored in a memory 52. The memory 52 stores a constant, a variable, a program or the like which are used for operation in the system control unit 50.

A nonvolatile memory 56 is an electrically erasable and recordable memory, for example, an electrically erasable and programmable read only memory (EEPROM).

An operation unit 70 is an operation means configured to input various operation commands to the system control unit 50.

A first shutter switch (SW1) 62 is switched on by a first stroke (for example a half press) of a shutter button (not shown) provided on the digital camera 100. When the first shutter switch (SW1) 62 is switched on, the system control unit 50 instructs a circuit (not shown) to start operation such as focusing control, exposure control and light amount control.

A second shutter switch (SW2) 64 is switched on by a second stroke (for example a full press) of the shutter button provided on the digital camera 100. When the second shutter switch (SW2) 64 is switched on, start of a series of processing including exposure processing, development processing and recording processing is instructed. First, in exposure processing, a signal read from the image sensor 14 is converted by the A/D converter 16, and image data is written into the memory 30 via the memory control unit 22. Further, development processing is executed using calculation in the image processing unit 20 and the memory control unit 22. Then, recording processing is executed in which the image data is read from the memory 30, compressed by the compression/decompression unit 32, and written into an external recording medium 120.

In the present exemplary embodiment, in a joint photographic experts group (JPEG) compression mode, the compression/decompression unit 32 reads the image data written into the memory 30, compresses the read image data at a set compression ratio, and then records the compressed image data in the external recording medium 120.

In a raw mode, the compression/decompression unit 32 reads the image data written into the memory 30 as it is for each line corresponding to a pixel arrangement of a color filter of the image sensor 14 via the A/D converter 16 and the memory control unit 22, and records the read data in the external recording medium 120.

An interface (I/F) 91 is an interface between the image processing unit 20 and the memory control unit 22, and the external recording medium 120.

A face authentication unit 101 analyzes the image data processed in the image processing unit 20 and photographed image data stored in the image display memory 24, and detects a human face contained in the photographed image. More specifically, the face authentication unit 101 detects an area (face area) which is expected to be a human face. When the face area is detected, the face authentication unit 101 outputs probability (reliability) of a human face, a position in an image, a size and others as information about the face area. Further, the face authentication unit 101 calculates and outputs feature amount data of a registered person (dictionary data) that indicates a feature amount of a face component (feature points) such as eyes, a nose, a mouth, and a face contour of the detected face area.

The external recording medium 120 maybe a nonvolatile semiconductor memory card, a card type hard disk or the like, and is detachably attached to the digital camera 100.

The digital camera 100 in the present exemplary embodiment detects an area of a human face from a photographed image, and generates feature amount data (dictionary data to be used in face authentication) which indicates a feature amount of a face component such as eyes, a nose, a mouth, and a face contour. Detection of the face area and generation of the feature amount data are executed in the face authentication unit 101 as described above.

The present exemplary embodiment is characterized in that the feature amount data is generated after partial gradation correction is performed on a shadow area when a shadow exists on a face due to a positional relation between a light source and the face such as an image photographed in oblique light or backlight.

Further, the partial gradation correction is executed with a signal before gamma correction with a gradation of 8 bits or larger, more specifically with a raw signal, so that tone jump can be prevented and more accurate dictionary data can be acquired. In the present exemplary embodiment, the face authentication unit 101 acquires dictionary data from an image for display which is generated in order to make the image display unit 28 function as an electronic view finder (EVF) to be used for observation of an object in real time.

Figure 2:
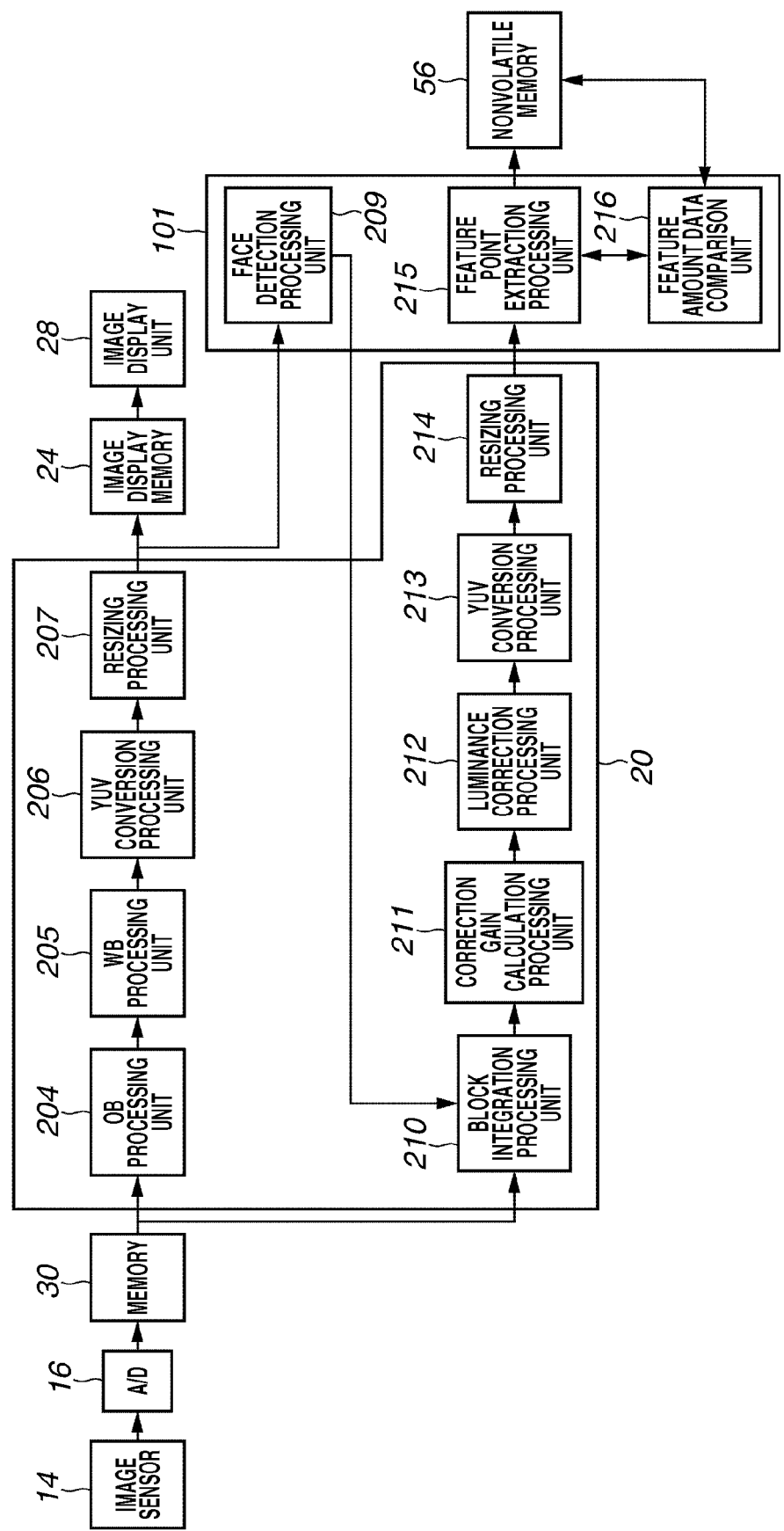
FIG. 2 is a schematic diagram illustrating a signal processing block of the image processing apparatus according to an exemplary embodiment.
Figure 3:
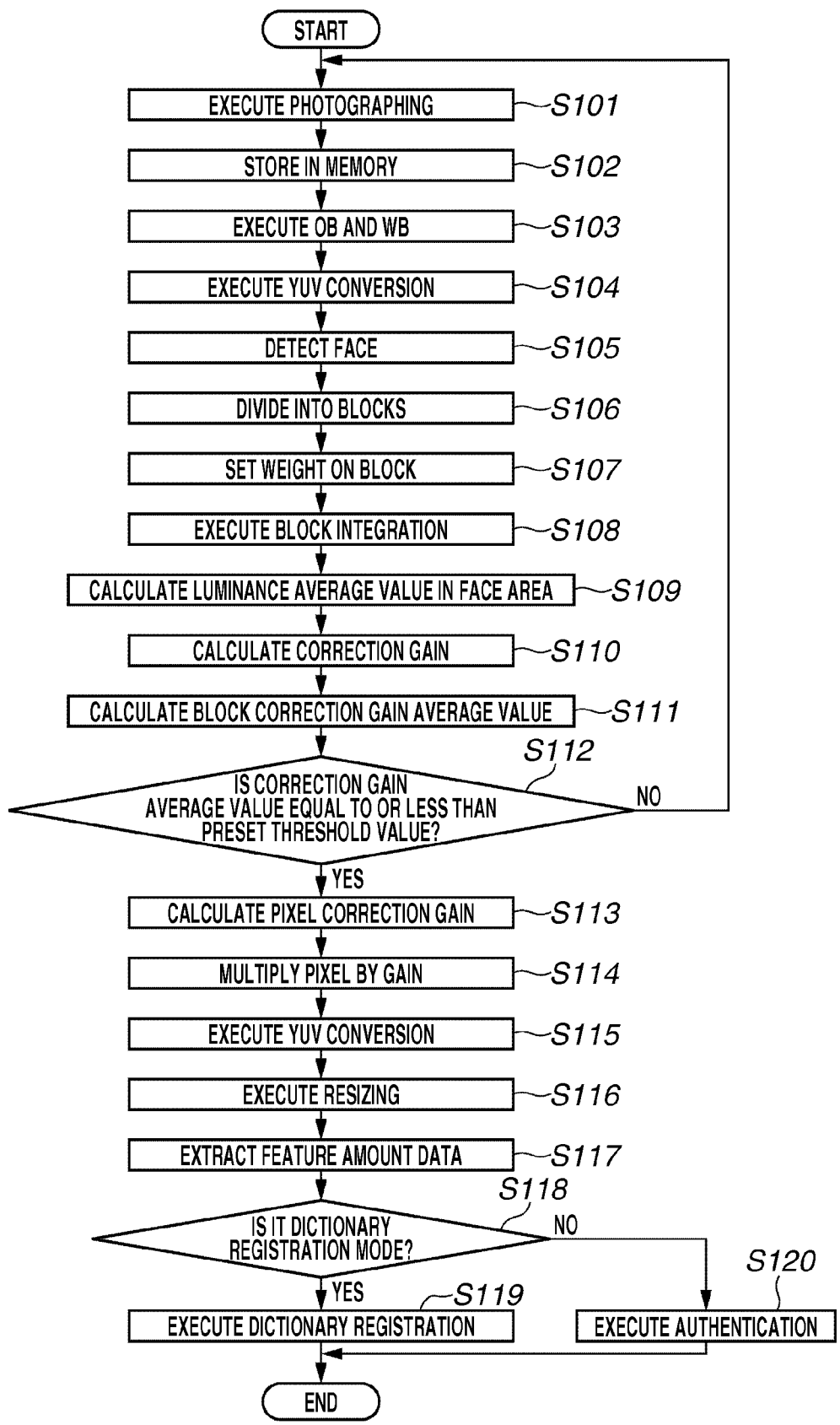
FIG. 3 is a flowchart illustrating an operation of a face image data acquisition unit according to the first exemplary embodiment.

FIG. 2 is a block diagram illustrating a configuration concerning acquisition of feature amount data in detail in the digital camera 100 in the present exemplary embodiment. FIG. 3 is a flowchart illustrating operation in FIG. 2. Acquisition operation of the feature amount data in the digital camera 100 in the present exemplary embodiment will be described referring to FIGS. 2 and 3.

In step S101 in FIG. 3, the image sensor 14 executes photographing of an object (not shown) in a preset cycle (one time per 1/30 second) and outputs an image signal corresponding to a photographed image.

In step S102, the A/D converter 16 converts an analog image signal from the image sensor 14 into a digital image signal and the memory 30 temporarily records the digital image signal. The image signal at this point is referred to as a raw signal or raw data.

In step S103, an optical black (OB) processing unit 204 executes black level correction processing that sets a black level of the raw signal at 0 using data on an optical black area of the image sensor 14. Further, a white balance (WB) processing unit 205 estimates a light source by known auto white balance correction processing and determines a gain (WB gain) which is multiplied to each color signal for adjusting a white level. Then, the WB processing unit 205 applies the WB gain to the raw signal.

In step S104, the signal to which the WB gain was applied, is converted from a red, green and blue (RGB) signal into a YUV signal by a YUV conversion processing unit 206. An RGB signal is a signal represented by an output value of a pixel corresponding to a color filter of each of red (R), green (G) and blue (B). A YUV signal is a signal represented by a luminance signal (Y) and a color difference signal (U and V). A resizing processing unit 207 resizes an aspect ratio of the YUV signal at 1:1 and writes the resized signal to the image display memory 24. Processing in steps S101 to S104 is repeated in a cycle of 1/30 second. Thus, the image display unit 28 can display a photographed image at 30 frames per second using the YUV signal and the function of the EVF.

In step S105, the YUV signal from the resizing processing unit 207, namely a signal representing an image for display is also supplied to a face detection processing unit 209. The face detection processing unit 209 detects an image area (face area) which seems to be a human face from the image for display, and outputs information such as a size, a position in the image and reliability as a face detection result to a block integration processing unit 210.

In face detection in the present exemplary embodiment, a known face detection technique can be utilized. As the known face detection technique, there is a method that is based on study utilizing a neural network or the like, and a method that searches for a part which has a distinctive shape such as eyes, a nose, and a mouth from the image using template matching and considers the image as a face when similarity is high. Further, there are many other methods, for example, a method that detects an image feature amount such as a skin color or shape of eyes, and uses statistical analysis. Generally, a plurality of these methods is used in combination to improve face detection accuracy. A specific example includes a method for detecting a face by utilizing wavelet transform and an image feature amount described in Japanese Patent Application Laid-Open No. 2002-251380.

Figures 4, 5:
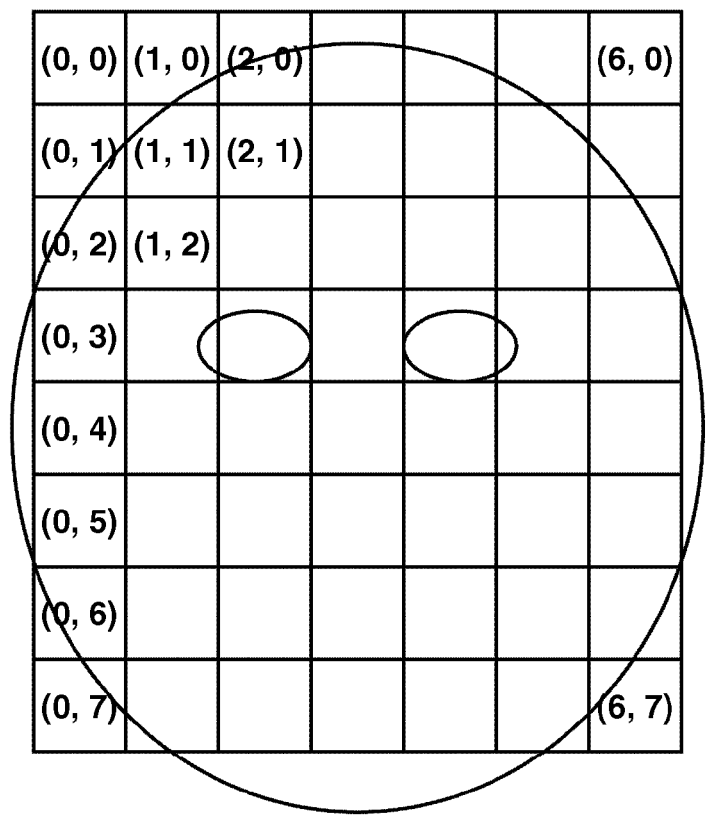
FIG. 4 illustrates block division of a face area.
FIG. 5 illustrates weighting of blocks.

In processing after step S106, correction for reducing a luminance variation in the detected face area is executed to reduce an influence of a shadow in the face area. In step S106, the block integration processing unit 210 regards the face area as a rectangular shape according to the face detection result from the face detection processing unit 209 and divides the face area into blocks as shown in FIG. 4. A size of a block can be determined in advance, for example, so that a face area having an average size is divided into a predetermined number.

In the present exemplary embodiment, a position of a divided block is represented by two-dimensional coordinates in which a block of an upper right-hand corner is specified by (0,0). In the example illustrated in FIG. 4, the face area is divided into 7 blocks in a horizontal direction and 8 blocks in a vertical direction. The block coordinates are from (0,0) to (6,7).

In step S107, the block integration processing unit 210 sets weight on each block. In the present exemplary embodiment, the weight for a block above the vicinity of eyes is set at 0. Further, the weight for a block containing a background is set at 0. The weight for other remaining blocks is set at 1. In the following description, the weight for a block (x,y) is denoted as BLW[x][y].

FIG. 5 illustrates an example of the weight to be set at blocks (0,4) to (6,7) in FIG. 4. Since blocks (0,0) to (6,3) which are above the eyes are not used in calculation, the description of these blocks is omitted in FIG. 5. Further, in the following description, "all blocks" represent the whole blocks to be used in calculation, namely blocks (0,4) to (6,7), and blocks (0,0) to (6,3) are not included.

In step S108, the block integration processing unit 210 calculates a luminance average value for each block. In the following description, a luminance average value of a block (x,y) is represented by YAV[x][y]. An example of luminance average values calculated for blocks (0,4) to (6,7) is shown in FIG. 6.

In step S109, the block integration processing unit 210 calculates a luminance average value AYAV in the face area using the block weight BLW[x][y] and the luminance average value YAV[x][y] for each block which are calculated in steps S107 and S108.

$$AYAV=(YAV[0][4]*BLW[0][4]+YAV[0][5]*BLW[0][5]+\ldots YAV[6][3]*BLW[6][3])/(BLW[0][4]+\ldots BLW[6][3])$$

FIG. 7 illustrates a value that is obtained by multiplying the block weight BLW [x][y] by the luminance average value YAV[x][y] for each block. Thus, the luminance average value AYAV (68.6) is obtained by dividing the total (1510) of the value of each block in FIG. 7 by the total value (22) of weight.

In step S110, a correction gain calculation processing unit 211 calculates a correction gain for correcting the luminance average value for each block to one predetermined luminance value. In the present exemplary embodiment, a correction gain (block correction gain) is determined for correcting the luminance average value of each block to a luminance average value of all blocks. A correction gain of a block (x,y) is calculated using the following expression. A block, the weight of which is 0, is not corrected (that is, correction gain=1).

$$CGA[x][y]=AYAV/YAV[x][y](BLW[x][y]>0)$$

$$CGA[x][y]=1(BLW[x][y]=0)$$

FIG. 8A illustrates an example of the block correction gain to be calculated when the average luminance value AYAV is 68.6. The block correction gain is not necessarily determined using the average luminance value. For example, a suitable luminance value for a face area is preset. Then, a block correction gain for correcting the luminance average value for each block to be the suitable luminance value may be determined. FIG. 8B illustrates an example of the block correction gain to be calculated when a suitable luminance value is 120.

In step S111, the correction gain calculation processing unit 211 calculates an average value of the block correction gain.

$$CGAAverage=(CGA[0][4]+CGA[0][5]+\ldots CGA[6][3])/28$$

In step S112, the correction gain calculation processing unit 211 compares a correction gain upper limit value for each sensitivity in photographing which is set in advance and the correction gain average value as shown in FIG. 9. When the correction gain average value exceeds the upper limit value (NO in step S112), the correction gain calculation processing unit 211 determines not to acquire the feature amount data from the current image and the processing returns to step S101 for next photographing operation. This is because a noise of an image after correction is increased as the value of the gain is increased. Therefore, reliability of the feature amount data is reduced. The higher the sensitivity in photographing, the higher an original gain. Accordingly, it is desired that the correction gain is small. Thus, the higher the sensitivity in photographing becomes, the smaller the upper limit value is set.

On the other hand, if the correction gain average value is the upper limit value or less (YES in step S112), then in step S113, the correction gain calculation processing unit 211 calculates a correction gain (pixel correction gain) for each pixel in a block from the block correction gain which is the gain for a block unit by interpolation processing such as linear interpolation.

In step S114, a luminance correction processing unit 212 executes luminance correction by multiplying a pixel in a block by the pixel correction gain.

In step S115, a YUV conversion processing unit 213 converts an image signal after the luminance correction into a YUV signal.

In step S116, a resizing processing unit 214 resizes an aspect ratio of the YUV signal at 1:1.

In step S117, a feature point extraction processing unit 215 extracts a face component of a person to be authenticated such as eyes, a nose, a mouth and a face contour, and its feature amount data by a known method based on the resized YUV signal and the face detection result.

In step S118, when the digital camera 100 is set at a dictionary registration mode that registers extracted feature amount data as dictionary data (YES in step S118), the processing proceeds to step S119. When the digital camera 100 is set in an authentication mode that verifies the feature amount data extracted from the image with the feature amount data that is already recorded in the nonvolatile memory 56 as the dictionary data (No in step S118), the processing proceeds to step S120.

In step S119, the feature point extraction processing unit 215 records the extracted feature amount data in, for example, the nonvolatile memory 56 as the dictionary data.

In step S120, the feature point extraction processing unit 215 outputs the extracted feature amount data to a feature amount data comparison unit 216. The feature amount data comparison unit 216 reads all dictionary data from the nonvolatile memory 56 and calculates similarity with the feature amount data output from the feature point extraction processing unit 215. Then, authentication is executed by determining that the dictionary data showing the highest similarity among the read dictionary data and the feature amount data output from the feature point extraction processing unit 215 are of the same person.

Thus, according to the present exemplary embodiment, the feature amount data is extracted after the luminance correction of the face area is executed to the image to extract the feature amount data necessary for face authentication. Accordingly, even when a shadow is cast on a face due to a lighting condition such as an image photographed under an environment of backlight or oblique light, influence of the shadow can be reduced and the dictionary data with excellent accuracy can be registered.

Further, the luminance correction processing is executed in a state of a raw signal before gamma correction. Thus, occurrence of the tone jump by the luminance correction can be suppressed, and the feature amount data with excellent accuracy can be acquired for a face component such as eyes, a nose, a mouth, and a face contour.

Furthermore, not only in performing an operation for extracting the feature amount data to be registered as the dictionary data, but also in executing face authentication using the registered dictionary data, authentication accuracy can be improved by extracting the feature amount data from the image to which the luminance correction processing is applied.

Next, a second exemplary embodiment of the present invention will be described. An image processing apparatus according to the present exemplary embodiment is characterized in that generation of a smear is detected in a face area and a feature amount of a face component having no influence of the smear is calculated when feature amount data (dictionary data) of a registered person is extracted which indicates the feature amount of the face component of a person to be authenticated such as eyes, a nose, a mouth, and a face contour.

In the present exemplary embodiment, a digital camera 100 with a configuration similar to the first exemplary embodiment can be used. Thus, overlapping description for a configuration is omitted. In the present exemplary embodiment, extraction operation of feature amount data to be registered as dictionary data will be described.

Figure 10:
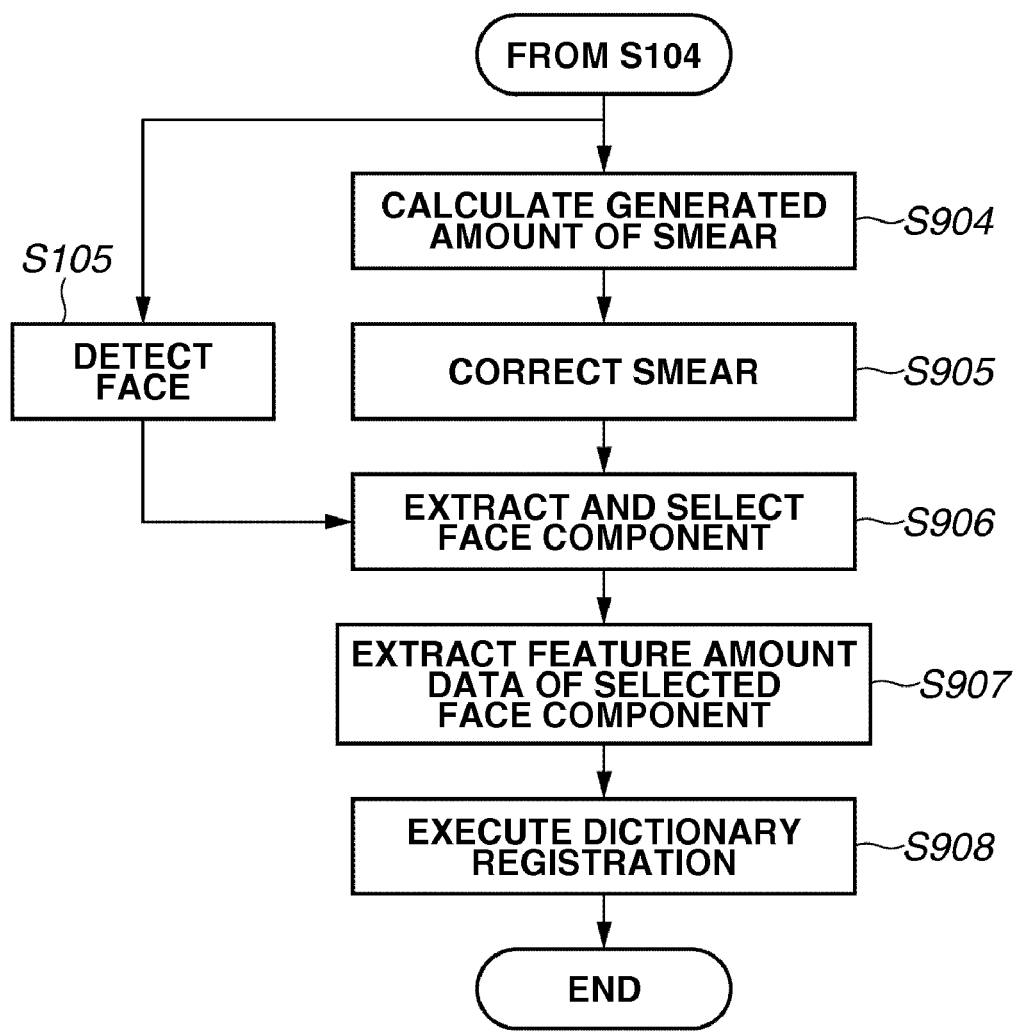
FIG. 10 is a flowchart illustrating an operation of a face image data acquisition unit according to a second exemplary embodiment.

FIG. 10 is a flowchart illustrating extraction processing of feature amount data performed by the digital camera 100 as an image processing apparatus in the present exemplary embodiment. In the present exemplary embodiment, feature amount data (dictionary data) of a face component used in face authentication is also extracted using an image for display.

First, similar to steps S101 to S104 in the first exemplary embodiment, photographing of an image for EVF display, generation of a YUV signal and resizing processing are executed.

In step S105, the YUV signal is supplied to the face detection processing unit 209 (FIG. 2) and a face area of a person is detected. In step S904, the image processing unit 20 calculates a smear generation amount.

Figure 11:
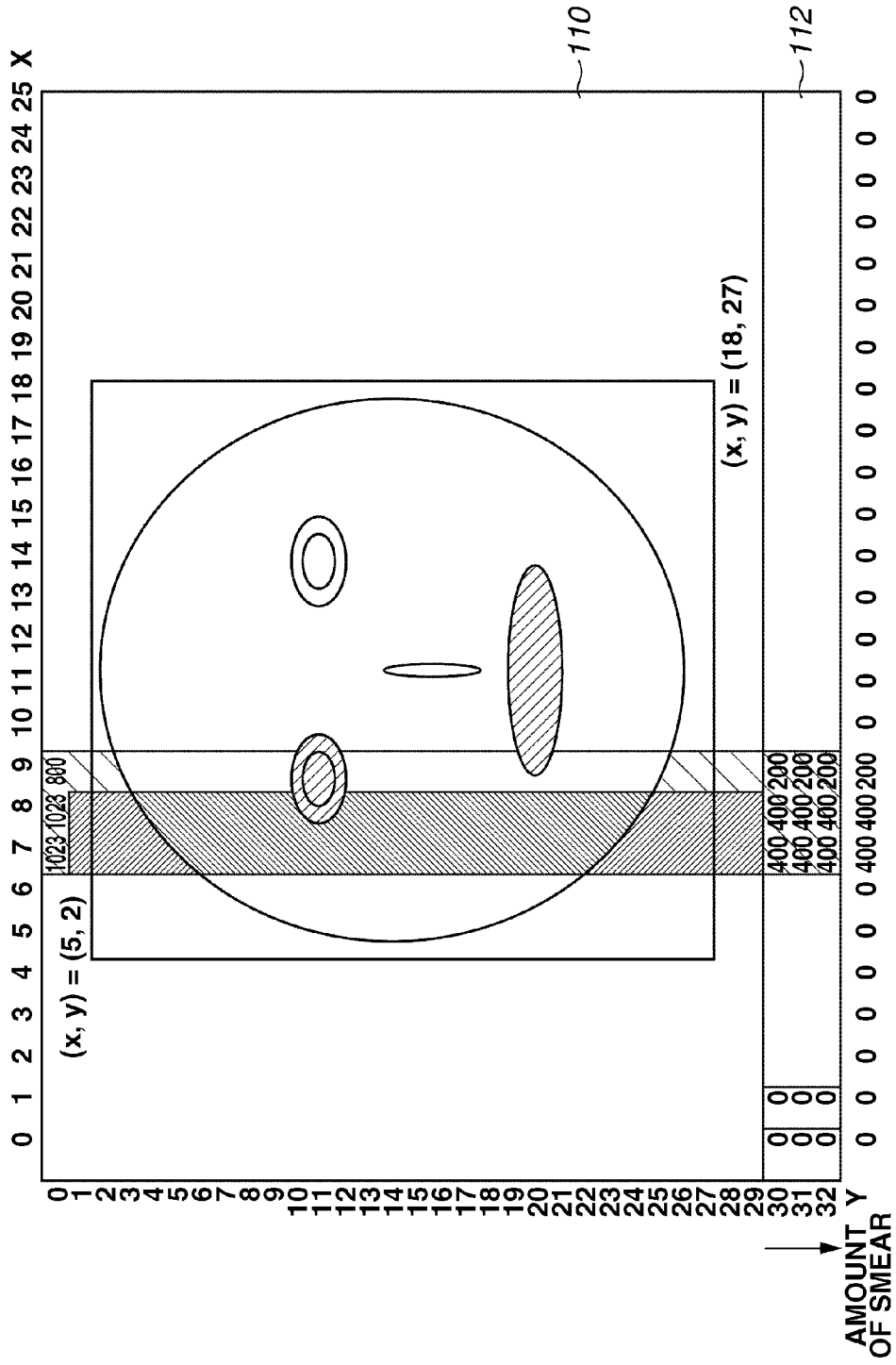
FIG. 11 illustrates a detected face, and a light receiving area and a light shielding area in an image sensor.

FIG. 11 illustrates the image sensor 14 which has, for convenience of description, a configuration including a light receiving pixel 110 of 26 pixels in a horizontal direction and 30 pixels in a vertical direction and a light shielding pixel 112 for smear detection of 26 pixels in a horizontal direction and 3 pixels in a vertical direction. In the following description, an output value of a pixel of the m th in the horizontal direction and the n th in the vertical direction is represented by PIX (m,n).

When the image sensor 14 is a CCD, a smear is generated by leakage of an electric charge from a saturated pixel to a vertical transfer path. Thus, the smear is propagated along the vertical transfer path and, for example, all pixels in a row direction provided by 7 to 9 on the X coordinate in FIG. 11 are influenced by the smear. Further, since the light shielding pixel 112 is shielded from light, its output is normally 0.

However, when the smear is generated, the smear is propagated by vertical transfer operation of the CCD and a value larger than 0 is output. Accordingly, an output pixel value in a smear detection area is added and averaged in the vertical direction, and a smear generation amount SME [m] in each row can be calculated.

For example, the smear generation amount SME[0] in the 0th row can be calculated by the following expression:

$$SME[0]=(PIX(0,30)+(PIX(0,31)+(PIX(0,32))/3$$

In the example in FIG. 11, the smear is generated in the 7th row to the 9th row. Their exemplary values are:

$$SME[7]=700,$$

$$SME[8]=400, \text{ and}$$

$$SME[9]=200 \text{ (when 10 bits } A/D \text{ converter is used in any case).}$$

In the present exemplary embodiment, the image processing unit 20 executes calculation of the smear generation amount. Further, the image processing unit 20 detects not only the smear generation amount but also a smear generation area and a saturated pixel area. The smear generation area and the saturated pixel area can be detected based on a pixel value in a row where generation of the smear has been detected.

Next, in step S905, the image processing unit 20 subtracts a smear value calculated for each row from a value of all pixels contained in the corresponding row to correct an increased pixel value by the smear. That is, the following calculation is executed.

$$PIX(m,n)=PIX(m,n)-SME[m]$$

In step S906, as described in the first exemplary embodiment, the face component and its feature amount data necessary for face authentication are extracted using a known method.

In step S907, information (face coordinate) about a position of the face area that the face detection processing unit 209 outputs as a face detection result is provided as a diagonal point coordinate of a rectangular area containing the face area. Then, in the example shown in FIG. 11, the face detection processing unit 209 outputs a coordinate (5,2) and a coordinate (18,27) as a face coordinate.

In the example shown in FIG. 11, the smear is generated in the rectangular area which has a coordinate (7,1) and a coordinate (9,29) as diagonal peaks. A case is described in which all light receiving pixels in the 7th row and the 8th row are saturated at pixel values of 1023 (when the A/D converter 16 of 10 bits is used) by generation of the smear, and the light receiving pixels in the 9th row have relatively small smear value and the pixel value is 1023 or smaller (i.e., 800).

In the present exemplary embodiment, the feature point extraction processing unit 215 is characterized by extracting the face component from the face image after smear correction and excluding the face component containing an area in which the pixel value is saturated before the smear correction from an extraction target of the feature amount data.

In the example shown in FIG. 11, since a right eye and a right cheek contour signals among the face components contain an image saturated by the smear, it can be extracted as the face component but its feature amount data is not registered as the dictionary data. In this case, either a method that extracts the feature amount data but does not register, or a method that does not extract the feature amount data may be used. On the other hand, regarding a mouth, since a right end thereof is on the smear generation area in the 9th row but the pixel in the 9th row is not saturated, the mouth is extracted as the face component from the image after smear correction and the feature amount data is extracted. Accordingly, in the example shown in FIG. 11, the feature amount data of mouth, left eye, nose, left cheek contour signals are extracted, and registered as the dictionary data. A type of the face component is not directly related to the present invention. Thus, these face components are merely examples and not intended to indicate that extraction of other face components is excluded. Extraction of all illustrated face components is not essential.

According to the present exemplary embodiment, when the dictionary data necessary for face authentication is registered from a photographed image, the smear generation area in the photographed image is detected, and the face component and the feature amount data are extracted from an image after smear correction. Thus, even under a strong light source such as external light, the dictionary data having small influence of the smear and high accuracy can be registered.

Further, the face component containing the saturated pixel area before smear correction is excluded from a target to be registered as the feature amount data. Thus, a registration amount of the feature amount data to be used in authentication can be reduced, accuracy of the feature amount data can be improved, and improvement of authentication accuracy can be realized.

Furthermore, not only when the dictionary data is registered but also when face authentication is executed using the registered dictionary data, the feature amount data can be extracted from an image to which similar processing is applied and improvement of authentication accuracy can be realized.

In the above description, a digital camera is used as an exemplary embodiment of the present invention but the present invention is not limited to the digital camera. The present invention can also be implemented by a digital video camera. Further, the present invention can also be implemented by an application on a personal computer if the feature amount data of a face detected from image data which is received from an attached recording medium, or via a network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-185293 filed Jul. 16, 2008 and No. 2009-135357 filed Jun. 4, 2009, which are hereby incorporated by reference herein in their entirety.

What is claimed is:

1. An image processing apparatus comprising:
a detection circuit configured to detect a face image;
a luminance correction circuit configured to divide an area of the face image into a plurality of blocks, to determine a block correction gain for correcting a luminance average value of each block to be a predetermined luminance value, and to correct a luminance value of each pixel in each block based on the block correction gain; and
an extraction circuit configured to extract feature amount data from the detected image corrected by the correction circuit for use in authentication processing.

2. The image processing apparatus according to claim 1, wherein the luminance correction circuit generates a pixel correction gain for each pixel from the block correction gain of each block, and corrects the luminance value of each pixel in each block by applying the pixel correction gain to each pixel.

3. The image processing apparatus according to claim 1, wherein the luminance correction circuit determines an average value of the block correction gain, and
wherein the extraction circuit does not extract the feature amount data when the average value exceeds a predetermined value.

4. The image processing apparatus according to claim 3, wherein the predetermined value is set at a higher value as sensitivity set for photographing the image becomes lower.

5. The image processing apparatus according to claim 1, further comprising:
a memory configured to register the feature amount data extracted by the extraction circuit as dictionary data to be used in the authentication processing.

6. The image processing apparatus according to claim 1, further comprising:
a comparison circuit configured to execute the authentication processing by calculating similarity between the feature amount data extracted by the extraction circuit and dictionary data stored in a memory in advance.

7. The image processing apparatus according to claim 1, wherein the luminance correction circuit executes the correction to a raw signal of the image.

8. An image processing apparatus comprising:
a detection circuit configured to detect an image;
a smear correction circuit configured to determine a smear generation area and a smear generation amount in the detected image and to correct a pixel value which is contained in the smear generation area based on the smear generation amount;
an extraction circuit configured to extract feature amount data to be used in authentication processing from the detected image corrected by the smear correction circuit; and
a memory configured to register the feature amount data extracted by the extraction circuit as dictionary data to be used in the authentication processing,
wherein the smear correction circuit detects a saturated pixel area in the smear generation area, and
wherein the memory does not register the feature amount data in the saturated pixel area as the dictionary data.

9. The image processing apparatus according to claim 8, wherein the smear correction circuit executes the correction to a raw signal of the image.

10. A method for image processing comprising:
detecting a face image;
dividing an area of the face image into a plurality of blocks, to determine a block correction gain for correcting a luminance average value of each block to be a predetermined luminance value, and to correct a luminance value of each pixel in each block based on the block correction gain; and
extracting feature amount data from the detected image to which correction for reducing the luminance variation is executed for use in authentication processing.

11. The method according to claim 10, further comprising:
registering the extracted feature amount data in a memory as dictionary data to be used in the authentication processing.

12. The method according to claim 10, further comprising:
executing the authentication processing by calculating similarity between the extracted feature amount data and dictionary data stored in a memory in advance.

13. A method for image processing comprising:
detecting an image;
determining a smear generation area and a smear generation amount in the detected image and correcting a pixel value which is contained in the smear generation area based on the smear generation amount;

extracting feature amount data from the detected image in which the pixel value contained in the smear generation area is corrected based on the smear generation amount for use in authentication processing; and detecting a saturated pixel area in the smear generation area, wherein feature amount data which does not reach the saturated pixel area among the feature amount data is registered in a memory as dictionary data to be used in the authentication processing, and wherein feature amount data which reaches the saturated pixel area is not registered in the memory as the dictionary data to be used in the authentication processing.

* * * * *